United States Patent [19]

Nakajima

[11] Patent Number: 4,544,111
[45] Date of Patent: Oct. 1, 1985

[54] BRAKE FOR A FISHING REEL

[75] Inventor: Hideki Nakajima, Sakai, Japan

[73] Assignee: Shimano Industrial Company Limited, Osaka, Japan

[21] Appl. No.: 470,338

[22] Filed: Feb. 28, 1983

[30] Foreign Application Priority Data

Mar. 9, 1982 [JP] Japan .................................. 57-37470
Mar. 9, 1982 [JP] Japan .................................. 57-37471

[51] Int. Cl.⁴ ............................................. A01K 89/02
[52] U.S. Cl. ............................. 242/84.52 B; 188/267; 252/84.53; 310/93
[58] Field of Search ................. 242/84.52 B; 188/267; 310/93, 105

[56] References Cited

U.S. PATENT DOCUMENTS 2,361,239 10/1944 Ransom ...................... 242/84.52 B
2,550,861  5/1951 Ransom ...................... 242/84.52 B
4,013,241  3/1977 Gray .......................... 242/84.52 B
4,327,873  5/1982 Juppet et al. ...................... 310/93

FOREIGN PATENT DOCUMENTS 2092872  2/1981 United Kingdom ......... 242/84.52 B

Primary Examiner—Billy S. Taylor
Attorney, Agent, or Firm—Stevens, Davis, Miller & Mosher

[57] ABSTRACT

A magnetic brake fishing reel is provided which includes a reel body rotatably supporting a spool and a drive mechanism supported to the reel body and having a clutch for releasably driving the spool. The magnetic brake has an electric conductor which is rotatable together with the spool. A magnet holder having at least one magnet is disposed opposite to the conductor. An adjustor which moves the magnet has an operating member positioned such that it is hand-operable by an angler gripping a fishing reel rod on which the reel is mounted.

4 Claims, 11 Drawing Figures 4,544,111

BRAKE FOR A FISHING REEL

FIELD OF THE INVENTION

This invention relates to a fishing reel, and more particularly to a fishing reel having a spool and a magnetic brake for reducing an overrun of the spool.

BACKGROUND OF THE INVENTION

Conventionally, a fishing reel is well-known which has a spool supported rotatably to a reel body, a drive mechanism for driving the spool, and a clutch mechanism interposed in a driving force transmission system of the drive mechanism, the clutch mechanism engaging to rotate the spool through the drive mechanism for winding a fishing line on the spool and disengaging to allow the spool to freely rotate for casting a fishing line.

The line wound onto the spool, when cast, is drawn by the weight of a fishing rig at the end of the line, at which time the spool rotates faster than the drawn line to cause a backlash, whereby the line may get twisted or enter between the spool and the reel body. Therefore, a brake means is provided to control the free rotation of the spool.

The brake means generally employs a centrifugal brake which exerts the braking action by slidably contact of brake shoes with a brake drum. Accordingly, a problem exists in that the braking effect varies due to wearing of the brake shoe.

In order to solve the above problem, a fishing reel provided with a magnet brake has been proposed which has a magnet and an electric conductor. One of the magnet and electric conductor is fixed to the reel body and the other rotates together with the spool to generate an eddy current by the rotary flux, so that the rotary member at the brake, under Fleming's left-hand rule, is subjected to a magnetic force in a direction reverse to its rotation, thereby exerting braking effect on the spool. The stationary member is made movable with respect to the reel body and an adjuster is provided axially outwardly of the spool and is operable to adjust the relative position of the magnet with respect to the electric conductor.

This braking method, which has no contact portion, can solve the problem of changing the braking effect due to the wearing of a braking member and also the adjuster can control the braking action in proportion to the number of rotations of the spool. However, the adjuster cannot adjust the braking effect in response to variations in the number of rotations of the spool. In other words, if a large braking effect is preadjusted to avoid the occurrence of backlash, the spool, at the initial stage of casting, is subjected to a large braking effect which results in a smaller casting distance. On the other hand, the braking effect, when preset to a minimum with respect to the number of rotations of the spool at the initial stage of casting, will permit casting to a greater distance, but easily creates backlash of the spool.

SUMMARY OF THE INVENTION

In the light of the above problem, this invention has been designed. An object of the invention is to provide a fishing reel which can cast a fishing rig to a greater distance while having a braking effect on the spool which is desirably adjustable by an angler and which is easily operable to prevent the backlash of the spool during casting.

The present invention has the basic idea that the braking effect on the spool is adjusted corresponding to variations in the number of rotations of the spool. A fishing reel of the invention, which is provided with a magnet brake comprising a magnet and an electric conductor for diminishing an overrun of the spool journalled to the reel body, is characterized in that an adjuster is operated to adjust the braking action by the magnet and is provided with an operating member operable by the finger of angler's hand gripping a fishing rod carrying the reel body to control the braking effect on the spool during the casting.

The fishing reel of the invention provided with the adjuster and operating member as abovementioned, allows the angler to merely touch his finger to the operating member to thereby increase the braking effect corresponding to the number of rotations of the spool. Accordingly, while the adjuster can adjust the braking effect to a minimum, the occurrence of backlash is reliably prevented. Also, the minimum braking effect can be preset to minimize rotational resistance against the spool at the beginning of casting, resulting in casting of the fishing line to a greater distance.

This invention alternatively may provide two first and second adjusters, the first adjuster adjusting the braking effect on the spool to a minimum and the second one providing an operating member operable by the finger of angler's hand gripping the fishing rod carrying the reel body, so that the operating member allows the second adjuster to change the braking action having been adjusted by the first adjuster.

Thus, while the braking action at the beginning of casting is adjustable, the angler can merely touch his finger to the operating member, thereby increasing the braking effect corresponding to an increment in the number of rotations of the spool.

Hence, backlash can reliably be prevented even with the braking effect adjusted to a minimum at the beginning of casting. The first adjuster also can preset the braking effect to a minimum, thereby minimizing the rotational resistance against the spool at the beginnging of casting and permitting casting to a greater distance.

These and other objects of the invention will become more apparent in the detailed description and examples which follow.

DETAILED DESCRIPTION OF THE INVENTION

Figure 1:
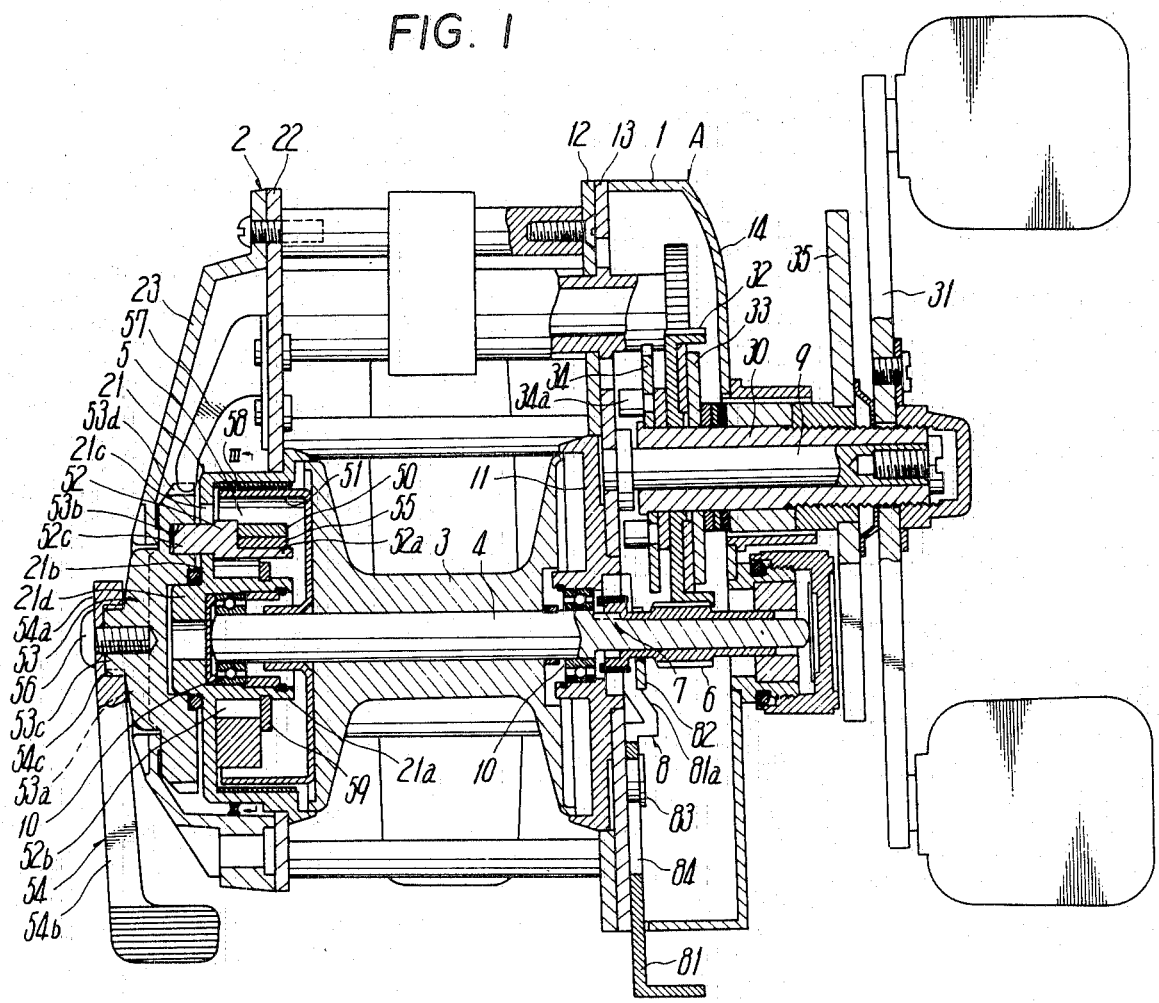
FIG. 1 is a cross-sectional plan view of an embodiment of a fishing reel of the invention.

Referring to the drawing, a reel body A comprises a pair of first and second side frames 1 and 2 opposite to each other at a given interval, the first side frame 1 comprising a side plate 12 having at the center a bearing housing 11, a doubling plate 13 attached to the outside of side plate 12, and a cup-like cover 14 attached to the outside of doubling plate 13, the second side frame 12 comprising a side plate 22 having at the center a bearing housing 21 and a cup-like cover 23 attached to the outside of side plate 22, and the bearing housing 21 housing therein a magnet brake 5 to be discussed below.

A spool shaft 4 having a spool 3 is journalled to the first and second side frames 1 and 2 through bearings 10, and extends at one end outwardly to project through the first side frame 1, so that the extension therein carries a pinion 6 rotatably and axially movably. Between the pinion 6 and the spool shaft 4 is provided a clutch means 7 engaging or disengaging through a clutch lever 81 at a clutch operating mechanism 8.

A handle shaft 30 is supported rotatably between the doubling plate 13 and the cover 14 through a support shaft 9, projects at one end outwardly from the cover 14 to fix a handle 31, and supports at the other end a master gear 32, a friction plate 33, and a return plate 34 having a plurality of clutch pins 34a, thus constituting a drive mechanism.

The friction plate 33 and return plate 34 are fitted onto the handle shaft 30 in relation of being rotatable not relative thereto but together therewith, the master gear 32 being fitted freely onto the handle shaft 30 to thereby transmit the rotation therefrom to the master gear 32 through the friction plate 33.

In addition, the press-contact strength of friction plate 33 to the master gear 32 is adjustable by use of an adjuster 35 screwable with one end of handle shaft 30.

The clutch means 7 comprises flat faces provided at an intermediate portion of spool shaft 4 and a cylindrical portion provided at the pinion 6 and having a not-circular inner surface engageable with the flat faces, the cylindrical portion disengaging therefrom by operating the clutch operating mechanism 8, thereby allowing the spool shaft 4 and the spool 3 thereon to freely rotate.

The clutch operating mechanism 8 comprises a clutch yoke 82 carrying the pinion 6 and urging it always in the direction of engaging the clutch means 7, the furcate clutch lever 81 having an urging portion 81a to urge the clutch yoke 82, and the return plate 34, the clutch lever 81 being mounted to the doubling plate 13 in relation of being movable in reciprocation perpendicular to the spool shaft 4 through a pin 83 and an elongate slot 84, and always biased in the direction of backward movement by a return spring (not shown). The clutch lever 81 is pushed to move the clutch yoke 82 axially of spool shaft 4, thereby moving the pinion 6 in the direction of disengaging the clutch means 7 and the handle 31 is rotated to hit the clutch pins 34a against a contact member (not shown) provided at the utmost end of clutch lever 81 to restore the clutch lever 81 by a spring force of a return spring, thereby moving the pinion 6 by the urging force of clutch yoke 82 in the direction of engaging the clutch means 7. In addition, the clutch lever 81 is swingable around the pin 83 at the doubling plate 13 and has at the utmost end an engaging portion, so that the engaging portion engages with a cutout stepped portion at the plate 13 to hold the clutch lever 81 in the position where its forward movement terminates.

Figure 2:
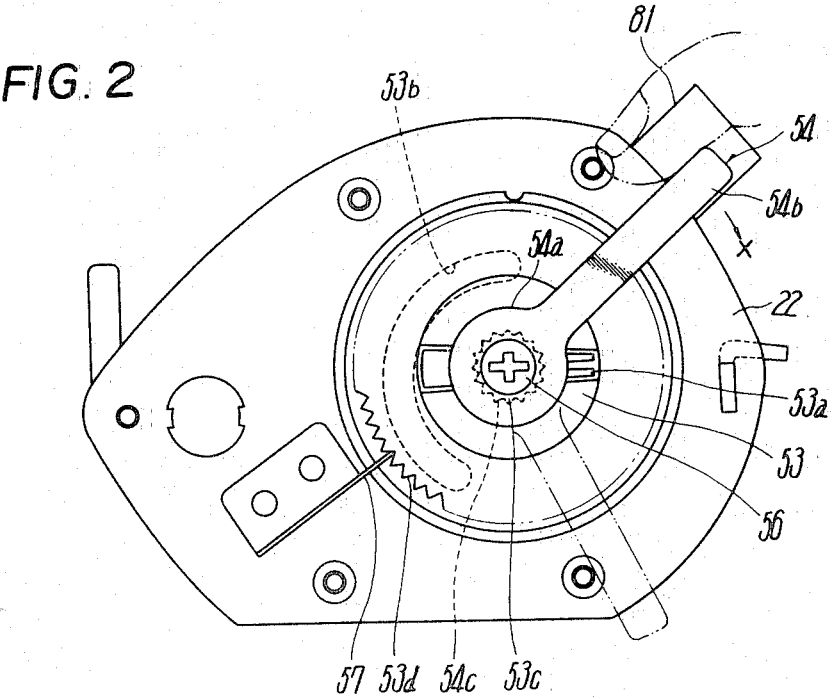
FIG. 2 is a side view of the FIG. 1 embodiment, from which a cover is removed.

Referring to FIGS. 1 and 2, the fishing reel constructed as foregoing is provided in the bearing housing 21 with the magnet brake 5 comprising a magnet 50 and an electric conductor 51. The electric conductor 51 is cylindrical and mounted concentrically to the spool shaft 4 or spool 3. A magnet holder 52 of non-magnetic material has at the center an elliptic shaft bore 52b and at the outer periphery a magnet support 52a for supporting the magnet 50 opposite to the inner periphery of electric conductor 51, and is supported at the shaft bore 52b radially movably onto the outer surface of a support cylinder 21a provided at the center of bearing housing 21. A guide bore 21c for guiding the magnet holder 52 radially is provided at the bottom wall 21b of bearing housing 21 and apart from the center thereof, into which an engaging projection 52c, provided at the side of holder 52, is inserted. A disc-like adjuster 53 having a knob 53a for rotary operation is supported rotatably to a support portion 21d at the outer surface of bottom wall 21b of bearing housing 21 and is provided at the inner surface with a cam groove 53b formed in a circular arc shifting circumferentially from the outer periphery toward the center of adjuster 53, the cam groove 53b engaging with the engaging projection 52c at the holder 52. The knob 53a is exposed outwardly from the cover 23 to be operable from the exterior, so that the adjuster 53 is rotated through the knob 53a to change the engaging position of engaging projection 52c with the cam groove 53b to move the holder 52 radially with respect to the support cylinder 21a, thereby adjusting the magnet 50 at the holder 52 in position with respect to the electric conductor 51. At the exposed portion of adjuster 53 outward from the reel body A is provided an operating member 54 which extends along the surface of cover 23 and projects radially of the spool 3 so that the angler can operate the operating member by his hand gripping the fishing rod (not shown) to increase the braking effect on the spool during the casting.

Figure 3:
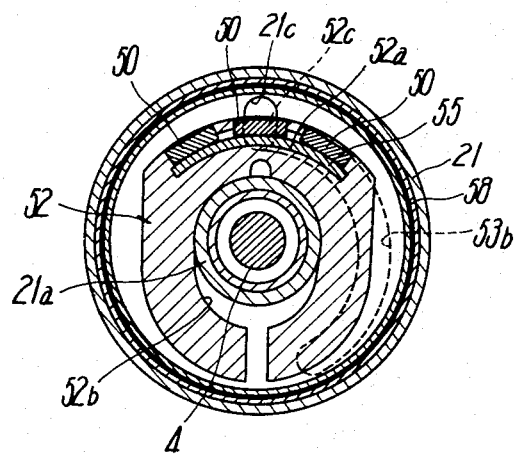
FIG. 3 is a sectional view taken on the line III—III in FIG. 1.
Figure 4:
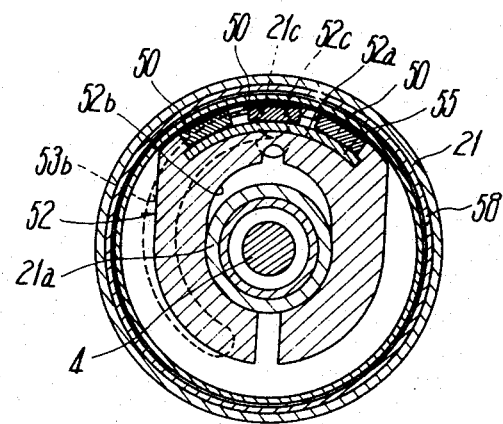
FIG. 4 is a view explaining adjustment of the braking effect in its increasing direction.
Figure 5:
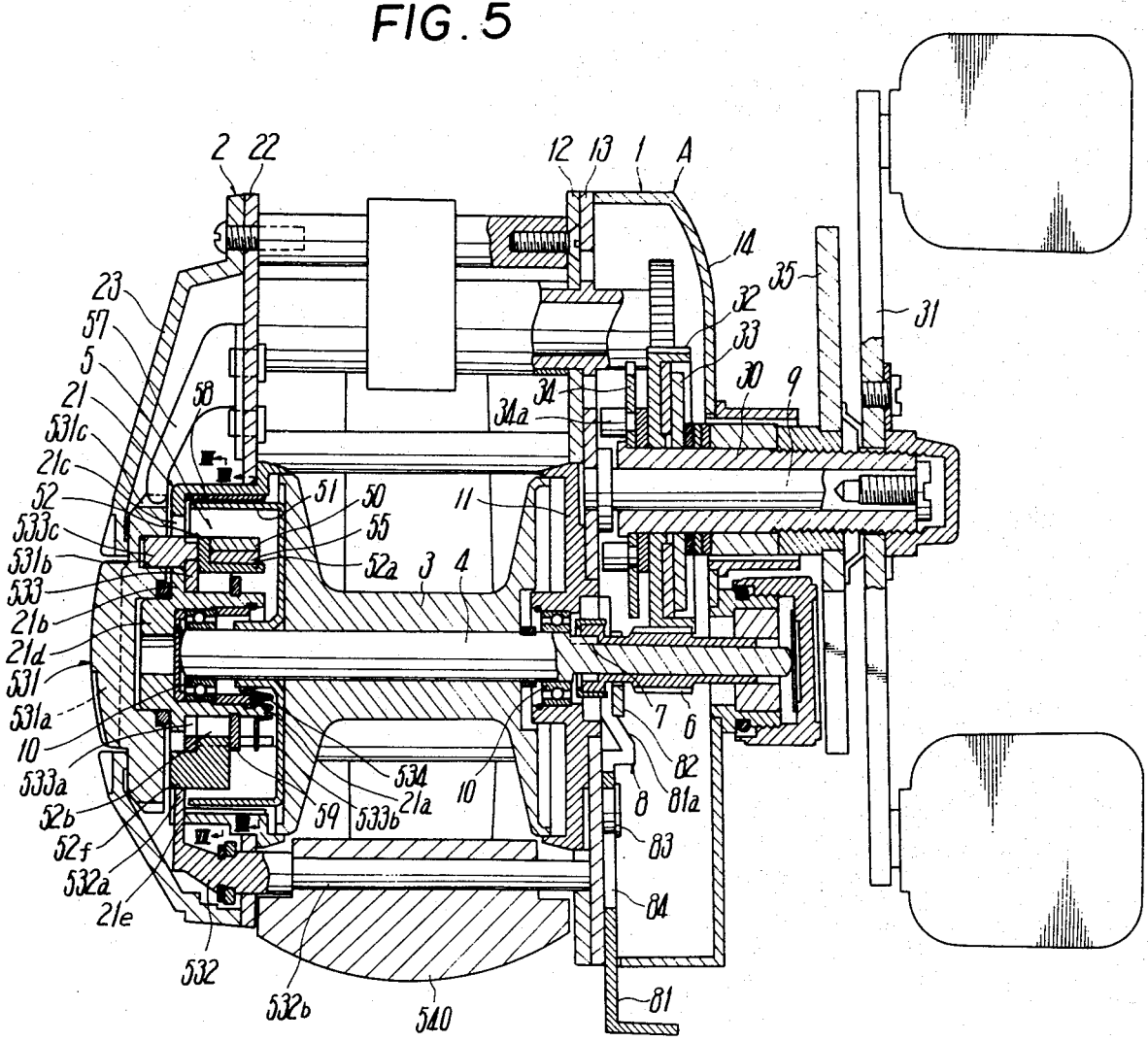
FIG. 5 is a cross-sectional view of a modified embodiment of the invention.
Figure 6:
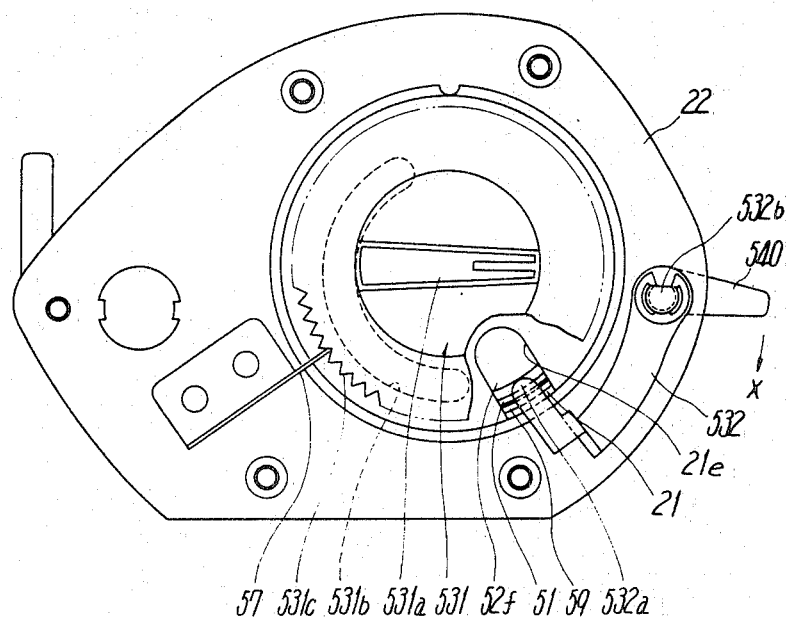
FIG. 6 is a side view of the FIG. 5 embodiment, from which a cover is removed.
Figure 7:
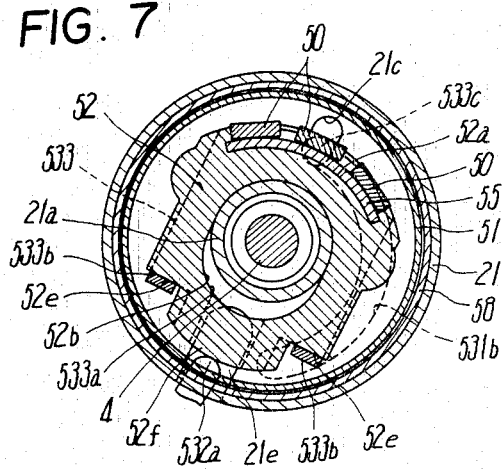
FIG. 7 is a sectional view taken on the line VII—VII in FIG. 5.
Figure 8:
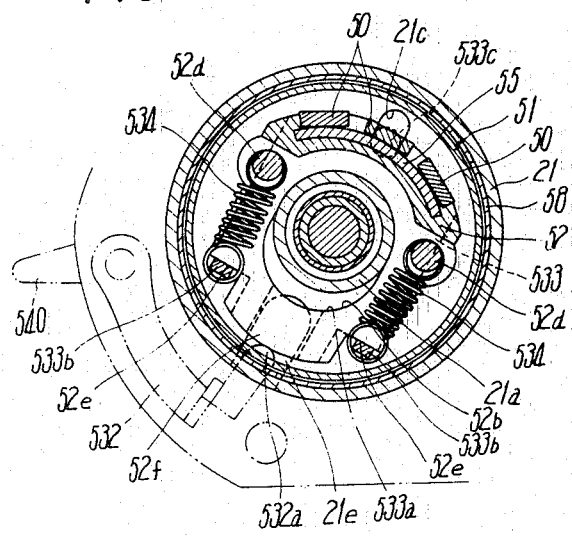
FIG. 8 is a partially omitted sectional view taken on the line VIII—VIII in FIG. 5.
Figure 9:
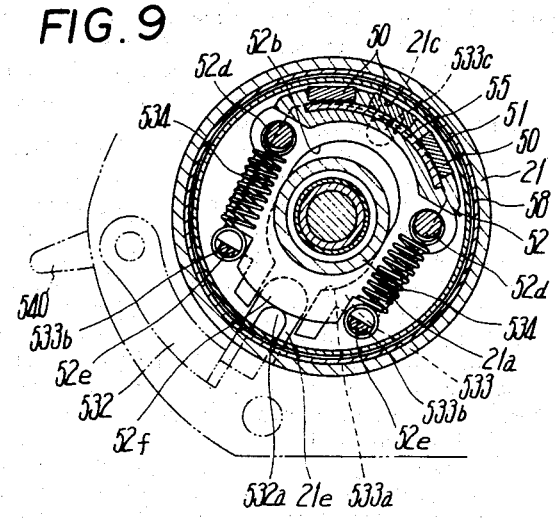
FIG. 9 is a view explaining of adjustment of the braking effect in the increasing direction by operating a second adjuster.
Figure 10:
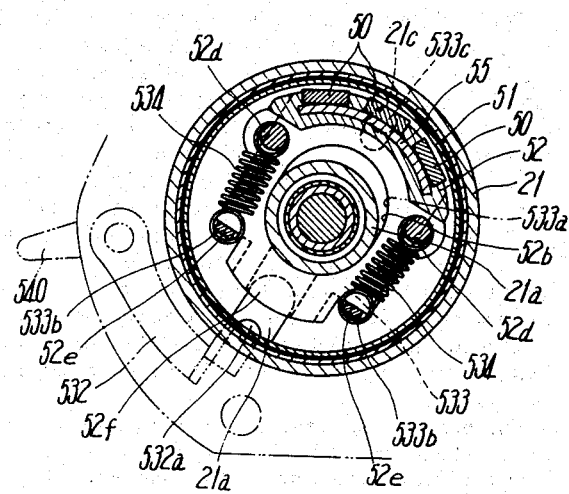
FIG. 10 is a view explaining of adjustment of the braking effect in the increasing direction by operating a first adjuster.

The magnet is supported at one side of the outer periphery of holder 52 and positionally adjustable from the position where the clearance between the magnet 50 and the electric conductor 51 is the maximum (the position shown in FIG. 3) to the position where the same is the minimum (the position shown in FIG. 4). Also, the magnet 50, as shown, comprises a N-pole magnet and two S-pole magnets at both sides thereof and is fixed to the support 52a at the outer surface of holder 52 through a fixing means, such as an adhesive. Alternatively, the holder 52 may be made from synthetic resin and the magnet 50 may be embedded in the holder 52 when molded.

The guide bore 21c provided at the bearing housing 21 is made elliptic so as to prevent the holder 52 from rotating with respect to the support cyllinder 21a and allow the holder 52 to move radially only with respect thereto.

The operating member 54 comprises a boss 54a and an operating portion 54b extending radially therefrom and preferably is mounted angular-adjustably to the adjuster 53 through the boss 54a. The adjuster 53, as shown in FIGS. 1 and 2, is provided at the exposed portion with a projection 53c having at the outer periphery a number of serrations and the operating member 54 has at the boss 54a a bore 54c having a number of serrations engageable with those at the projection 53c, the bore 54c being fitted onto the projection 53c through engagement of serrations to adjust the angle of operating member 54 with respect to the adjuster 53, and then a mounting means, such as a set screw, fixes the operating member 54 at the adjusted position. Incidentally, the operating member 54 may be mounted to the adjuster 53 through a polygonal projection and a polygonal bore engageable therewith. The particular mounting means is not critical.

In the fishing reel constructed as foregoing, the clutch lever 81 is operated to disengage the clutch means 7 to allow the spool 3 to freely rotate for casting, at which time the electric conductor 51 attached to the spool 3 or spool shaft 4 rotates within the magnetic field of magnet 50 and the direction of magnetic flux passing through the conductor 51 changes in the rotation direction of conductor 51, following the rotation thereof, whereby an eddy current is generated in the conductor 51 by the change of magnetic flux, whereby a magnetic force in the reverse direction to rotation of conductor 51 is generated by a Fleming's left-hand rule, thereby exterting the braking action on the spool 3.

The braking action is controllable by movement of magnet holder 52 adjusted by the adjuster 53 and operating member 54. In other words, the adjuster 53, when rotatably operated, transmits its operating force from the cam groove 53b to the holder 52 through the engaging projection 52c and the holder 52 moves radially with respect to the support cylinder 21a as the engaging position of the engaging projection 52c with the cam groove 53b changes, whereby the magnet 50 changes in position with respect to the conductor 51 within in a range from the position where the clearance between the magnet 50 and the conductor 51 is the maximum to the position where the same is the minimum, thereby changing the magnetic flux density and adjusting the braking action exerted onto the spool 3. Accordingly, the braking effect can be adjusted to a minimum as desired by angler prior to the casting.

On the other hand, in a case of using the operating member 54, the angler touches the finger of his hand gripping the rod to the free end of operating member 54, thereby rotating it in the direction of the arrow X in FIG. 2. The operating force, similarly to the direct operation of adjuster 53, is transmitted therefrom to the holder 52 so that the holder 52 moves radially outwardly with respect to the support cylinder 21a. Hence, the magnet 50 shifts from the maximum clearance position to the minimum with respect to the conductor 51, so that the magnetic flux density increases to increase the braking effect. Accordingly, during the casting, when the fishing rig arrives in the vicinity of the surface of the water and the backlash tends to occur, the angler operates the operating member 54 by the finger of his hand gripping the rod carrying the reel body A to abruptly increase the braking effect, thereby ensuring the elimination of backlash. The operating member 54 is manually restored, but it may be restored automatically by the use of a spring or the like.

Also, in FIGS. 1 and 2, a number of serrations 53d are provided circumferentially at the outer periphery of adjuster 53, and a retainer 57 formed of a flexible plate member is fixed at one end to the side plate 22 by calking or the like, the retainer 57 engaging at the other end with one of serrations 53d, thereby maintaining the adjuster 53 in its adjusting position. The retainer 57, during the rotation of adjuster 53, is bent to disengage from the serration 53d.

In addition, in FIG. 1, reference numeral 58 designates a magnetic ring provided at the inner periphery of bearing housing 21 opposite to the conductor 51, and 59 designates a C-like shaped snap ring for locking the holder 52 to the support cylinder 21a.

Alternatively, the magnet 50 may be shifted circumferentially or axially of spool 3 to adjust the position of magnet 50 with respect to the conductor 51, or the conductor 51 may be moved radially, circumferentially or axially of spool 3 to thereby adjust its position with respect to the magnet 50. In this case, the magnet 50 is mounted on the spool 3 or spool shaft 4, the conductor 51 being supported, for example, to the support cylinder 21a movably radially, circumferentially or axially with respect to the magnet 50. In brief, the magnet 50 and conductor 51 need only be adjustable in position relative to each other. Also, the magnet 50 may be provided radially outwardly of the conductor 51.

The operating member 54 alternatively may be integral with the adjuster 53. However, the operating member 54, when separate therefrom, is advantageous in that the angler can dispose the operating member 54 always in the most suitable position for adjusting the braking action. Also, the operating member 54 alternatively may project from within the second side frame 2 radially outwardly of spool 3, and may be mounted to the adjuster 53 through an intermediate member, and may be provided at the first side frame 1 carrying the handle 31 or between the first and second side frames 1 and 2. In brief, the operating member 54 need only be positioned operably by the finger of angler's hand gripping the fishing rod.

Furthermore, the operating member 54 alternatively may operate the adjuster 53 to decrease the braking effect from the preset minimum intensity adjusted by the adjuster 53.

Next, explanation will be given of a modified embodiment (a second embodiment) of the invention in accordance with FIGS. 5 through 10.

This embodiment provides two first and second adjusters 531 and 532, the first adjuster 531 serving to adjust the braking action exerted on the spool 3 at the initial stage of casting, the second adjuster 532 providing an operating member 540 operable by the finger of an angler's hand gripping the rod, so that the operating member 540 can control the braking effect having been adjusted by the first adjuster 531.

In addition, in FIGS. 5 through 10, components which are the same as those in the former embodiment (the first embodiment) are designated by the same reference numerals.

In FIGS. 5 through 10, a brake 5 similarly to the first embodiment, comprises a cylindrical electric conductor 51 mounted to the spool 3 concentrically with the spool shaft 4, a magnet holder 52 of non-magnetic material having a magnet holding portion 52a and an elliptic bore 52b at the center, and a magnet 50 held to the magnet holding portion and opposite to the inner periphery of conductor 51.

The second embodiment provides a control member 533 disposed in contact with one side of holder 52 and having at the center an elliptic shaft bore 533a. The holder 52 and control member 533 are supported at the elliptic bores 52b and 533a thereof to the outer surface of support cylinder 21a at the center of bearing housing 21 in relation of being movable radially of support cylinder 21a and provide pairs of spring seats 52d and 533b opposite to each other at the predetermined intervals in the moving directions of holder 52 and control member 533. Also, springs 534 are interposed between the spring seats 52d and 533b respectively and bias the holder 52 to have the maximum clearance between the magnet 50 and the conductor 51. The spring seats 533b engage with engaging portions 52e provided at the outer surface of holder 52 to thereby control a moving range of holder 52 biased by the springs 534. A guide bore 21c for radially guiding the holder 52, similarly to the first embodiment, is formed at the bottom wall 21b of bearing housing 21 and shifts from the center thereof, into which bore 21c is inserted an engaging projection 533c provided at one side of control member 533. A first adjuster 531 having a knob 531a for rotary operation is supported rotatably onto the support portion 21d at the outer surface of bottom wall 21b of bearing housing 21. Furthermore, the first adjuster 531, similarly to the first embodiment, is provided at the inner surface with a cam groove 531b of a circular arc and shifting circumferentially from the outer periphery toward the center, the cam groove 531b insertably engaging with the engaging projection 533c perforating through the guide bore 21c. The knob 531a is exposed outwardly from the cover 23 so as to be operable from the exterior so that the adjuster 531 rotates to change the engaging position of engaging projection 533c with the cam groove 531b, thereby moving the control member 533 and holder 52 radially with respect to the support cylinder 21a, thus adjusting the magnet 50 in position with respect to the conductor 51. A second adjuster 532 is supported rotatably to the second side frame 2 and has a contact portion 532a which enters into the bearing housing 21 through a window 21e provided at the peripheral portion of bearing housing 21 and which comes into contact with a stopper 52f provided at the outer surface of holder 52. The second adjuster 532 is rotatably adjusted to increase the braking effect already adjusted by the first adjuster 531.

Also, the second adjuster 532 has a support shaft 532b journalled to the first and second side frames 1 and 2 which carries the operating member 540.

Thus, the operating member 540 interposed between the first and second side frames 1 and 2, is easily operable by the fingers of angler's hand gripping the rod during casting.

When using a fishing reel of the above construction, the first adjuster 531 is operated to adjust the braking action at the initial stage of casting by rotating the knob 531a at the first adjuster 531.

Now, the knob 531a is operated to rotate the first adjuster 531 to change the engaging position of cam groove 531b with the engaging projection 533c and an operating force of adjuster 531 is transmitted to the holder 52 through the projection 533c, control member 533, spring seats 533b and springs 534, so that the holder 52 together with the control member 533 is moved radially with respect to the support cylinder 21a. Hence, the magnet 50 held on the holder 52 changes in position with respect to the conductor 51 in the range from the maximum clearance to the minimum clearance between the magnet 50 and the conductor 51, whereby the density of magnetic flux passing through the latter is changed to enable adjustment of the braking effect on the spool 3. Accordingly, the angler can desirably adjust the braking effect to a minimum prior to the casting.

Then, during casting, the second adjuster 532 is operated to further adjust the braking effect. In this case, the angler pushes the operating member 540 by the finger of his hand gripping the rod to rotate it in the direction of the arrow X in FIG. 6, so that the operating force is transmitted from the contact portion 532a at the second adjuster 532 to the holder 52 through the stopper 52f thereof and the holder 52 is moved radially outwardly with respect to the support cylinder 21a and control member 533, whereby the magnet 50 at the holder 52 shifts with respect to the conductor 51 from the position where the clearance between the magnet 50 and the conductor 51 is adjusted to a maximum to the position where the same is adjusted to a minimum, thus increasing the magnetic flux density for the conductor 5 and also the braking effect.

Therefore, the second adjuster 532, when the fishing rig arrives in the vicinity of the surface of the water, is operated to abruptly increase the braking effect on the spool 3 to ensure elimination of backlash. In addition, the second adjuster 532, after being released, returns together with the holder 52 by virtue of the springs 534.

In addition, the first adjuster 531, similarly to the first embodiment, is maintained in its adjusting position by use of a number of serrations 531c and a retainer 57 engageable therewith.

In this embodiment, the magnet 50 alternatively may be moved circumferentially or axially of spool 3 to be adjusted in position with respect to the conductor 51, or the conductor 51 may be moved radially, circumferentially or axially of spool 3 for the same purpose. In this case, the magnet 50 is mounted to the spool 3 or spool shaft 4, the conductor 51 being mounted to, for example, the support cylinder 21a in relation of being movable radially, circumferentially or axially with respect to the magnet 50.

In brief, the magnet 50 and conductor 51 need only be adjustable in position relative to each other.

The magnet 50 alternatively may be provided outside the conductor 51. Also, in a case of moving the magnet 50 radially of spool 3, other than that the separate control member 533, as shown, is moved together with the holder 52 when adjusted by the first adjuster 531 but the holder 52 only is moved when adjusted by the second adjuster 532, the control member may be integral with the holder 52. In this case, for example, a relief space for the engaging projection 533c is provided at the outside of cam groove 531b at the first adjuster 531.

The operating member 540 may utilize a thumb rest, or be separate therefrom. It is preferable to provide the operating member 540 between the first and second side frames 1 and 2, but it may be provided at either side frame. In brief, it need only be operable by the finger of an angler's hand gripping the rod. Also, the second adjuster 532 alternatively may be movable, for example, radially of spool 3.

Alternatively, the second adjuster 532 may be operated to decrease the braking action having been adjusted to a maximum by the first adjuster 531.

The abovementioned first and second embodiments adjust the braking effect by adjusting the movement of magnet 50 away from or toward the conductor 51. Alternatively, a plurality of pairs of magnets 501 and 502, as shown in FIG. 11, may be disposed at both sides of conductor 51 and held to first and second magnet holders 521 and 522, so that the outside magnets 501 or inside ones 502 (the inside magnets 502 in FIG. 11) may be changed in circumferential position with respect to the other magnets (the outside magnets 501 in FIG. 11) by circumferentially moving the holder 522 of the inside magnets 502, thereby adjusting the braking effect.

Figure 11:
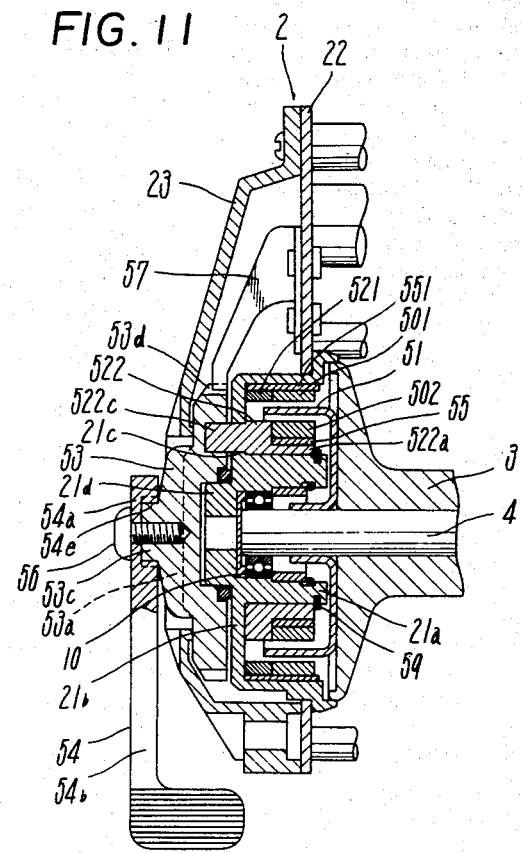
FIG. 11 is a cross-sectional view in part of another modified embodiment of the invention.

In FIG. 11, the support portion 21d at the bearing housing 21, as in FIG. 1, provides a rotatable adjuster 53, with which an engaging projection 522c at the holder 522 engages, thereby moving the holder 522 in association with the adjuster 53, the adjuster 53 providing the operating member 54.

In addition, the holder 521 holding the outside magnets 501 is fixed to the inner periphery of bearing housing 21 through a cylindrical magnetic material 551.

The inside magnets 502, as in FIG. 1, are fixed to a recessed holding portion 522a through a magnetic plate 55. Other structures are the same as in the FIG. 1 embodiment. In addition, in FIG. 11, the components which are the same as those in FIG. 1 are designated by the same reference numerals.

Incidentally, the construction in FIG. 11 is applicable to the embodiment shown in FIGS. 5 through 10.

Although the invention has been described with reference to several different embodiments, these embodiments are merely exemplary and not limiting of the invention which is defined solely by the appended claims.

What is claimed is:

1. A fishing reel comprising: a reel body supporting a spool rotatably, said reel body having a pair of side frames; a drive mechanism supported to said reel body and having a clutch for releasably driving said spool; a magnet brake having a cylindrically-shaped electric conductor rotatable together with said spool, a magnet holder having at least one magnet opposite to said conductor, and adjuster means which moves said magnet, said adjuster means comprising means for moving said magnet holder radially relative to said conductor to adjust a gap in a radial direction between said magnet and said conductor, said adjuster means having a support shaft journalled to said side frames and an operating member mounted on said support shaft between said side frames and positioned so as to be operable by an angler's hand when gripping a fishing reel rod on which said reel is mounted.

2. A fishing reel according to claim 1, wherein said holder comprises spring means for biasing said holder and magnet to shift one-sidedly toward or away from said conductor.

3. A fishing reel according to claim 1, wherein said adjuster means comprises first and second adjusters for independently adjusting the movement of said magnet toward or away from said conductor, said second adjuster having an operating member disposed in a position where said operating member is operable by an angler's hand.

4. A fishing reel according to claim 3, further comprising a control member contacting one side of said holder and movable relative to said holder within a predetermined range, and wherein an association member for transmitting operation of said first adjuster to said control member is provided between said control member and said first adjuster, and compression springs are provided between said control member and said magnet holder.

* * * * *